(12) United States Patent
Potter et al.

(10) Patent No.: US 7,211,307 B2
(45) Date of Patent: *May 1, 2007

(54) LOW PERMEATION POLYMER FUEL TANK

(75) Inventors: James F. Potter, Livonia, MI (US); Heather L. Knechtges, Saline, MI (US)

(73) Assignee: Visteon Global Techologies, Inc., Van Buren Township, MI (US)

( * ) Notice: Subject to any disclaimer, the term of this patent is extended or adjusted under 35 U.S.C. 154(b) by 527 days.

This patent is subject to a terminal disclaimer.

(21) Appl. No.: 10/278,419

(22) Filed: Oct. 23, 2002

(65) Prior Publication Data

US 2004/0009315 A1   Jan. 15, 2004

Related U.S. Application Data

(60) Provisional application No. 60/395,008, filed on Jul. 11, 2002.

(51) Int. Cl.
*B29D 22/00* (2006.01)
*B29D 23/00* (2006.01)
*B32B 1/08* (2006.01)

(52) U.S. Cl. .......... 428/36.7; 428/36.6; 428/35.7; 428/424.6; 220/567.2; 220/4.14

(58) Field of Classification Search .......... 428/36.6, 428/36.7, 424.6, 35.7; 220/567.2, 4.14
See application file for complete search history.

(56) References Cited

U.S. PATENT DOCUMENTS

| | | | |
|---|---|---|---|
| 3,606,958 A | 9/1971 | Coffman | |
| 3,916,048 A | 10/1975 | Walles | |
| 4,123,582 A * | 10/1978 | Musyt | 428/335 |
| 4,159,781 A | 7/1979 | Bartlow et al. | |
| 4,258,082 A * | 3/1981 | Horne | 427/160 |
| 4,631,225 A | 12/1986 | Nishimura | |
| 5,129,544 A | 7/1992 | Jacobson et al. | |
| 5,547,096 A | 8/1996 | Kleyn | |
| 5,589,241 A | 12/1996 | Stiles et al. | |
| 5,928,745 A | 7/1999 | Wood et al. | |
| 5,961,764 A * | 10/1999 | Sydow et al. | 156/242 |
| 6,136,354 A * | 10/2000 | Wood et al. | 426/323 |
| 6,218,024 B1 * | 4/2001 | Tamber et al. | 428/520 |
| 6,357,617 B1 | 3/2002 | Kido | |
| 2001/0045433 A1 * | 11/2001 | Ellis | 220/562 |
| 2002/0028309 A1 | 3/2002 | Dooley et al. | |
| 2002/0051856 A1 | 5/2002 | Delbarre | |

FOREIGN PATENT DOCUMENTS

| | | |
|---|---|---|
| EP | 1 108 594 | 6/2001 |
| JP | 362-163824 | 7/1987 |
| JP | 406-106690 | 4/1994 |
| JP | 0638634 A * | 11/1994 |
| JP | 08244180 A * | 9/1996 |
| JP | 09143419 A * | 6/1997 |

* cited by examiner

*Primary Examiner*—Michael C. Miggins
(74) *Attorney, Agent, or Firm*—Dickinson Wright PLLC

(57) ABSTRACT

A permeation resistant polymer fuel tank having a multilayer wall that includes a structural layer and a vapor barrier layer. A secondary barrier layer is attached to the multilayer wall wherein the vapor barrier layer and the second barrier layer have a permeation rate less than the structural layer. A protective coating may be applied over the secondary barrier layer to add durability and prevent degradation of the secondary barrier layer from environmental hazards that fuel tanks may be exposed to.

14 Claims, 5 Drawing Sheets

LOW PERMEATION POLYMER FUEL TANK

CROSS-REFERENCE TO RELATED APPLICATION

This application claims the benefit of U.S. Provisional Application No. 60/395,008, filed Jul. 11, 2002, the entire disclosure of this application being considered part of the disclosure of this application and hereby incorporated by reference.

BACKGROUND OF THE INVENTION

The present invention relates to fuel tanks and more particularly to polymer fuel tanks, and a method for reducing permeation of gaseous fluids.

Historically, fuel tanks have been manufactured from stamped metal shell halves. Metal fuel tanks are not only expensive, but add weight to a vehicle and are subject to corrosion. To reduce cost, weight, and avoid corrosion problems associated with metal fuel tanks, manufacturers have switched to using polymer fuel tanks in vehicles.

Polymer or plastic fuel tanks are corrosion resistant and weigh less than metal fuel tanks. One problem with polymer fuel tanks is that fuel vapor may permeate through the polymeric container walls. A polymer fuel tank formed from a thermoplastic resin such as polyethylene or polypropylene can have fuel permeability up to several grams per day, releasing hydrocarbon molecules typically comprising aromatic, aliphatic, oxygenate, alcohol, etc. or mixtures thereof. Polymer fuel tanks made of other materials may release these and other components of fuel.

Manufacturers have attempted a variety of techniques to reduce the permeation of polymer fuel tanks. One technique used to improve the barrier properties of fuel tanks is to electroplate the polymeric fuel tank with a layer of copper, nickel, and chrome. The problem with electroplating a polymer fuel tank is that an electroplatable polymer must be used or the polymer must be pre-treated for electroplating. The electroplating of three successive layers of different metals is also expensive, time consuming, and the electroplated layers may be subject to corrosion.

Yet another way of reducing fuel vapor emissions through polymer fuel tanks is to use a primary vapor barrier layer such as an ethylene vinyl alcohol copolymer (EVOH). EVOH provides an effective barrier layer to prevent fuel emissions, is somewhat flexible, and is relatively inexpensive. One problem with EVOH is that while it has some flexibility it is too brittle for many applications and may be subject to degradation when exposed directly to fuels containing alcohol or other fuel additives. Therefore, EVOH barrier layers are commonly placed between layers of polymeric material. However, EVOH, like most primary barrier layers, is not able to bond to itself to form a continuous layer when formed shell halves are joined to form the fuel tank. Typically, when the flanges are heat welded together, polyethylene from each shell half is welded together to form the fuel tank. Because the layers of EVOH do not bond to each other, these fuel tanks allow fuel vapors to permeate in areas where the EVOH or primary vapor barrier layer does not meet or bind to itself. Polymer fuel tanks formed from polyethylene with a central EVOH barrier layer may transmit up to 50 mgs of fuel vapor per day.

A polymer fuel tank may include additional areas of permeation. After the shell of the fuel tank is formed, various items such as vapor valves, fill check valves, fill nipples, recirculation nipples, or fuel filler necks may be attached to the fuel tank. Even if the fuel tank contains a primary barrier layer, this layer is breached when cutting holes to attach the valves, nipples, and necks. Because these attached items are generally formed from the same polymeric materials as the fuel tank to allow them to be welded to the fuel tank, they provide a permeation pathway for fuel vapors to exit the tank.

Even if a barrier layer is added to the attached item, for example, to the fuel filler neck, permeation may still occur. Permeation occurs because the primary barrier layer in the fuel tank is not able to bond to the barrier layer in the attached item to form a continuous barrier layer. The resulting diffusion pathway near attached items is relatively short, allowing easy permeation. The amount of permeation is inversely proportional to the length of the dispersion pathway.

SUMMARY OF THE INVENTION

The aforementioned problems are overcome by the present invention wherein a polymeric fuel tank is coated with a secondary polymeric barrier layer, such as polyvinylidene chloride or other material that is solvent soluble and that possesses approximately the same permeation resistance as the primary barrier.

In the pinch off area of the fuel tank the ends of the upper and lower EVOH layers are exposed by the removal of the excess material (flash). Application of a secondary barrier layer bridges the upper and lower EVOH layers creating a continuous permeation barrier in the pinch off region of the fuel tank. Areas having a discontinuous, unexposed primary barrier layer may also be coated with the secondary barrier layer, to reduce permeation by increasing the dispersion pathway. The distance from the areas having a discontinuous primary barrier layer to which the secondary layer is applied may be determined by the desired reduction in permeation. The coating may be applied to attached items to further reduce permeation. In some embodiments, the secondary barrier layer may be applied to the complete exterior surface, including attachments to further reduce evaporative emissions from the polymeric fuel tank. The present invention provides a low cost, light weight, and easy to manufacture polymeric fuel tank that reduces permeation and evaporation of fuel.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

I. Construction

Figure 1:
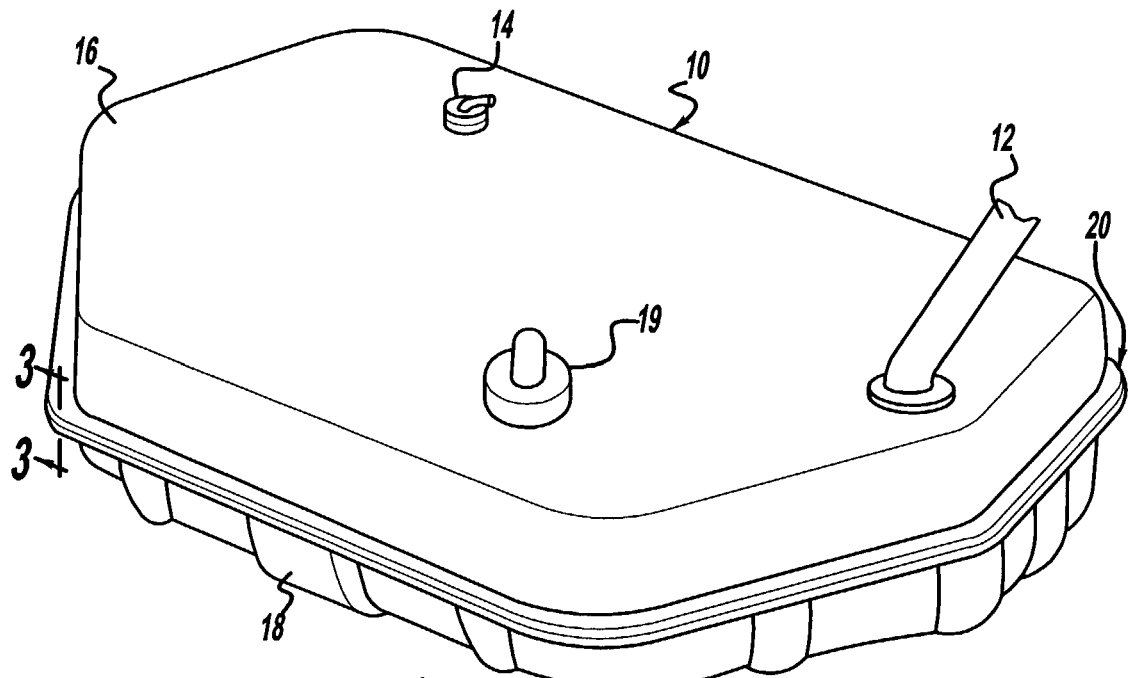
FIG. 1 is a perspective view of a fuel tank according to the present invention.

A polymeric fuel tank shell 10 is generally illustrated in FIG. 1 to include upper and lower shell halves 16 and 18 coupled together by flanges 20. The upper shell half 16 may include a filler neck or pipe 12, a vapor valve 14, a fill limit valve 19, and other attached items. The configuration of the filler neck 12, vapor valve 14, and fill limit valve 19 may vary from application to application.

Figure 2:
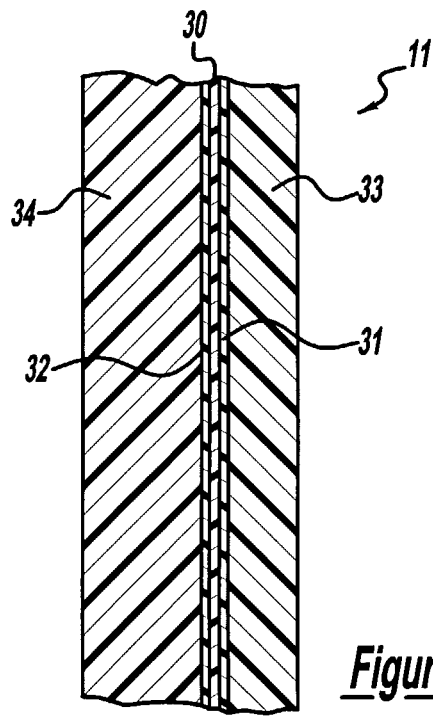
FIG. 2 is a sectional view of a typical wall section away from the pinch off area of the tank.

As shown in FIG. 2, the shell halves of fuel tank 10 are formed from a multilayer wall 11 having layers that provide structural support and a vapor barrier. Structural support layers 33 and 34 protect the fuel tank from abrasion and impact and provide the necessary rigidity and strength. The structural support layers 33 and 34 may be formed out of a variety of suitable materials known in the art such as polyethylene, high-density polyethylene, nylon, polypropylene, polyester, and a variety of other synthetic materials. Desirable properties of the structural support layer material include good impact strength, cold temperature resistance, pressure and vacuum resistance, environmental stress crack resistance, and chemical exposure resistance. In the illustrated embodiment, the structural support layers 33 and 34 are formed from polyethylene, preferable high-density polyethylene (HDPE).

The multilayer wall 11 also includes a primary vapor barrier layer 30 constructed of a material having a permeation rate to hydrocarbon vapors less than that of the structural support layers and preferably less than about 10 mg/mm/m$^2$/day. The primary vapor barrier layer 30 provides a low permeation vapor barrier to reduce permeation through the walls of the fuel tank 10. In the illustrated embodiment, the primary vapor barrier layer 30 is formed from an ethylene vinyl alcohol copolymer (EVOH) having a hydrocarbon vapor permeation rate of 2 mg/mm/m$^2$/day. Notwithstanding this illustrative example, those skilled in the art will appreciate that other materials may be suitable for the primary vapor barrier layer 30, including nylon, polyvinylidene chloride, polyvinylidene fluoride, and liquid crystal polymer. General characteristics of suitable materials for the primary barrier layer 30 are low fuel and oxygen permeability rates, sufficient flexibility, and the ability to adhere to other polymeric materials with the use of an adhesive.

In the illustrated embodiment, a first adhesive layer 31 bonds the vapor barrier layer 30 to the inner structural layer 33 while a second adhesive layer 32 bonds the vapor barrier layer 30 to the outer structural layer 34. The adhesive layers 31 and 32 may be formed from any suitable adhesive known in the art, preferably a modified low-density polyethylene (LPDE). The primary barrier layer 30 is illustrated in FIG. 2 as being located between the structural layers 33 and 34, but it should be readily apparent that a variety of other configurations may be used. One example of such configurations is where the primary barrier layer 30 forms the inner surface of the fuel tank and the fuel tank includes only one outer structural layer.

Figure 3:
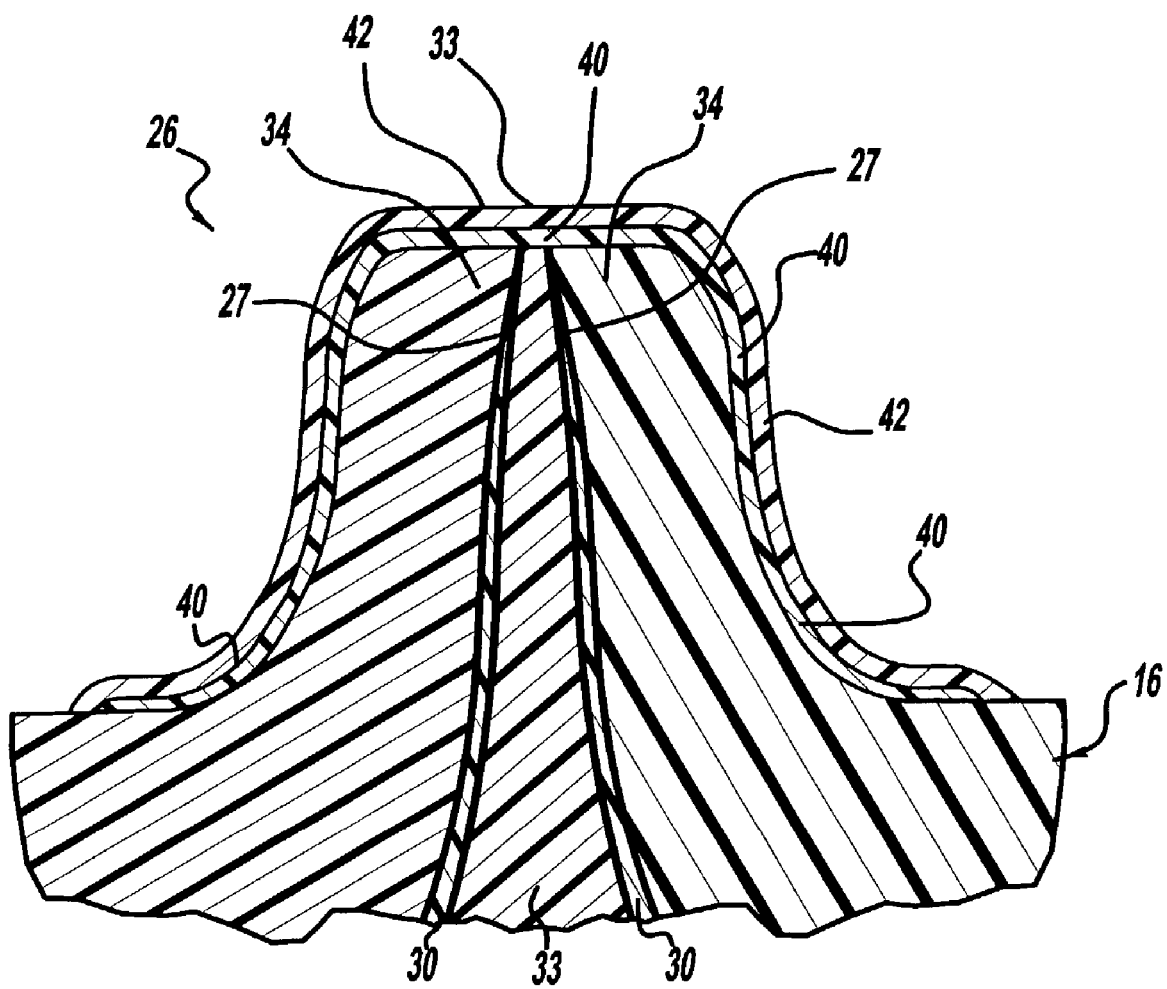
FIG. 3 is a sectional view of the pinch off region of the fuel tank taken along line III—III in FIG. 1.

As can be seen in FIG. 3, the upper shell half 16 and lower shell half 18 form a pinch-off area 26 resulting from the flanges 20 being pinched or fused together during manufacture of the fuel tank 10. In the pinch-off area 26, the primary vapor barrier layers 30 converge but do not bond together. The vapor barrier layers 30 are commonly separated by the inner structural layers 33 and covered by the outer structural layers 34. A bond area 27 is created outward of the tapered ends of the primary barrier layers 30 where the inner structural layers 33 are bonded. The outer structural layers 34 traverse through the pinch off area 26 and into the flash, never re-bonding to each other. When the flash is removed via a cutting (de-flashing) operation, the inner structural layers are bonded together while the other layers are distinct separate layers exposed at the end and bonded to one another via layer adhesion. This configuration creates a fuel vapor permeation path in the bond area 27. Thus, fuel vapors may permeate through the walls of the fuel tank 10 in the pinch-off area 26 by flowing through the inner structural layer 33 and the outer structural layer 34, successively, where the vapor barrier layers 30 do not form a continuous vapor barrier.

As further seen in FIG. 3, a secondary barrier layer 40 may be placed over the outer structural layer 34 to prevent or lower vapor emissions. While a variety of materials providing a suitable bond and having the ability to reduce permeation may be used, in the illustrated embodiment the secondary barrier layer 40 is polyvinylidene chloride. An example of a suitable polyvinylidene chloride is Dow Chemical Saran F-310 barrier polymer. Saran F-310 is particularly suitable for this application because it is durable, flexible, chemically resistant and permeation resistant to fuel vapors. Of course, other polyvinylidene chlorides or materials may be used as the secondary barrier layer 40. General characteristics of acceptable materials include solvent soluble materials that have permeation rates less than the structural layers 33 and 34. The secondary barrier layer 40 should be capable of adhering to a polyethylene surface. Surface treatment of the polyethylene, such as flame treatment, corona discharge, or plasma is acceptable to promote adhesion. The secondary barrier layer 40 must be applied by a process that does not deteriorate performance of the fuel tank. For example, an application process that uses high temperatures, typically above 120° C. may degrade the structural layers 33 and 34 or the adhesion of the layers, which in turn may decrease the life expectancy and deteriorate the performance of the fuel tank 10. The secondary barrier material 40 should also exhibit good chemical resistance, flexibility, resistance to degradation in the thermal extremes of the environment, and physical durability to road hazards such as stone pecking or sand abrasion.

In the illustrated embodiment, the secondary barrier layer 40 is applied only to the exterior surface of the fuel tank in the areas approximately around pinch area 26 in order to minimize costs while achieving the desired permeation rates. Since the primary barrier layers 30 are exposed at the ends of the pinch, the secondary barrier layer 40 bridges the separated primary barrier layers 30 in the pinch off area 26, bridging the separate primary barrier layers 30 creating a continuous barrier layer in the pinch area 26. The applied secondary barrier also extends beyond the pinch off area 26. This provides an added benefit, as the barrier in the pinch off area 26 is typically thinner than in other regions of the tank. As the distance away from the pinch area 26 to which the secondary barrier layer 40 is applied increases, the permeation is reduced. It should be readily appreciated that the secondary barrier layer 40 may also be applied to the inner surface of the fuel tank 10 over the inner structural layer 33.

Figure 4:
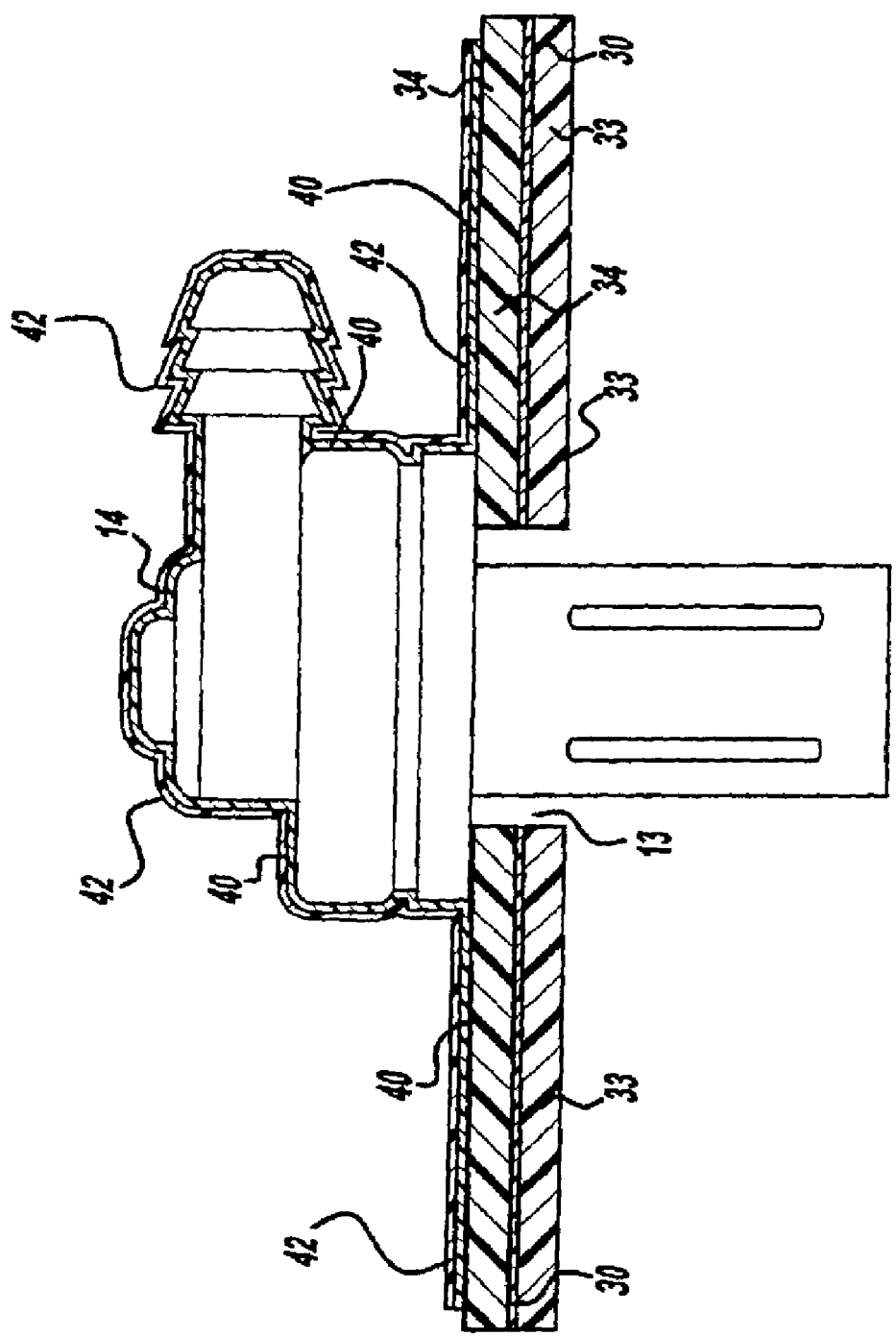
FIG. 4 is a partial sectional view of the fuel tank with a welded on vapor valve.
Figure 5:
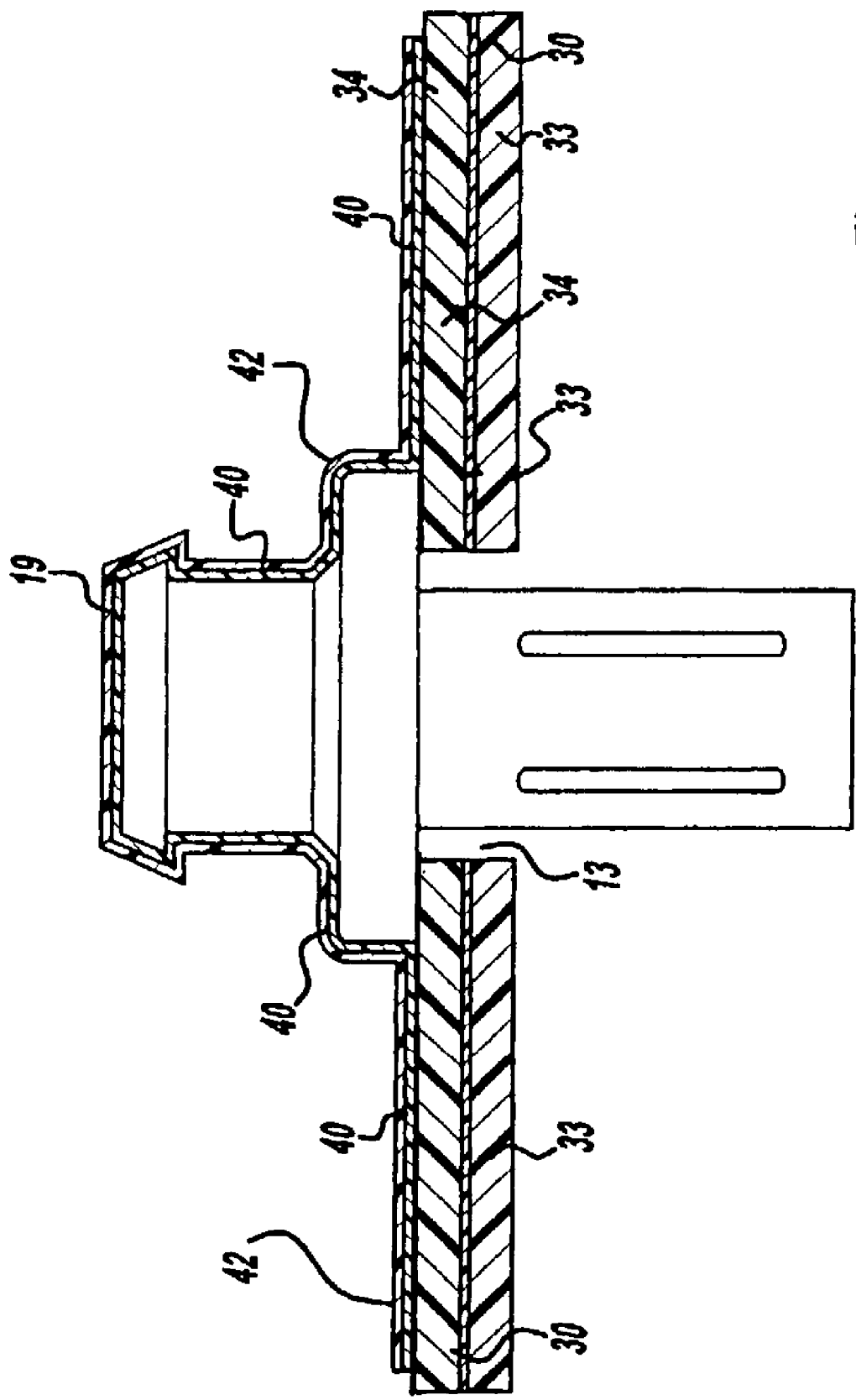
FIG. 5 is a partial sectional view of the fuel tank with a welded on fill check valve.

As shown in FIG. 4 and FIG. 5, items such as vapor valves 14 and fill check valves 19 may be attached to the fuel tank 10. The attached items are commonly disposed in holes provided in the walls of the fuel tank 10. These attached items are generally formed of the same material as the inner and outer layers 33 and 34 of the tank, and may allow permeation of fuel vapors. Even if the items are formed of a permeation resistant material, the primary vapor barrier layer 30 is usually spaced apart from the valve 14 or filler neck 19 (see gap 13 in FIGS. 4 and 5). This gap 13 allows fuel vapors to permeate through the outer structural layer 34 and around the interface between the attached item and the tank wall. To minimize this vapor leakage, the secondary barrier layer 40 may be applied over portions of the attached item and the outer structural layer 34, in at least an area surrounding the attached item.

Figure 6:
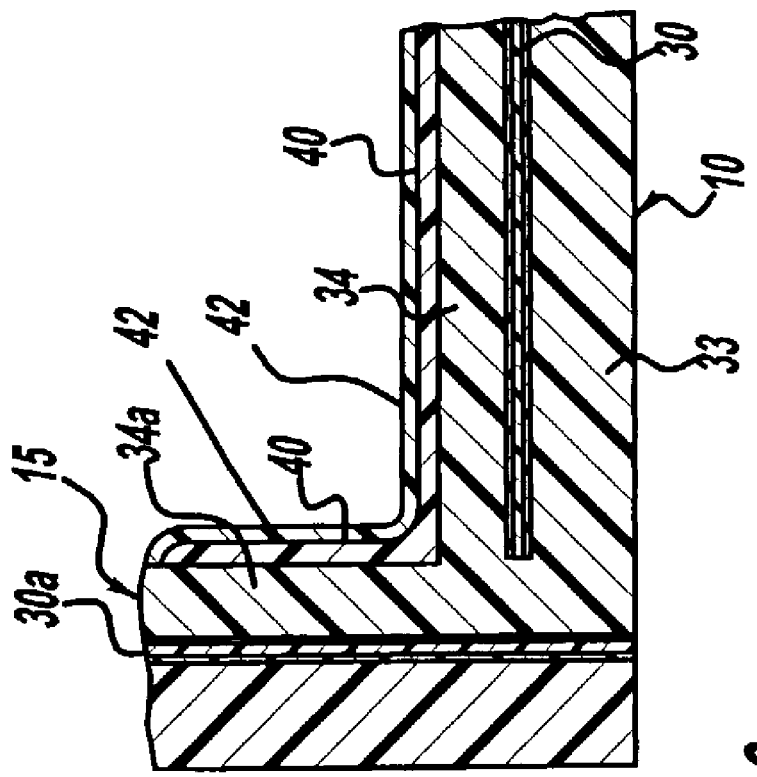
FIG. 6 is a partial sectional view of the fuel tank with a welded on filler neck.

As may be seen in FIG. 6, a fuel filler neck 12 containing a primary vapor barrier layer 30a may be welded or otherwise attached to the fuel tank 10. When the fuel filler neck 12 is attached, the primary vapor barrier layers 30 and 30a do not form a continuous vapor barrier layer. This allows fuel vapors to permeate through the outer layer 34a of the filler neck 12 and/or the outer structural layer 34 of the fuel tank 10. In this instance, as may be seen in FIG. 6, the secondary barrier layer 40 may be applied to the outer layer 34a of the filler neck 15 and the outer structural layer 34 of the fuel tank 10. As with the pinch-off area 26, the greater the distance away from the area of permeation that the secondary barrier layer 40 is applied, the less fuel vapors that can permeate from the fuel tank 10.

As shown in FIGS. 2–6, a protective coating 42 may be added to the fuel tank 10 over the secondary barrier layer 40. While a permeation resistant fuel tank 10 may be formed without the protective coating 42, the protective coating adds durability by protecting the secondary barrier layer 40 from rocks, stones, sand, chemical attack, and other environmental hazards to which a fuel tank may be subjected. More specifically, the protective coating helps protect the secondary barrier layer 40 from being punctured, thereby preventing the creation of permeation pathways. In the illustrated embodiment, the protective coating 42 is formed of a material that is easy to apply with the necessary durability. Examples of suitable materials include urethanes, acrylics, enamels, epoxies, undercoating materials and rubber-based materials. In the illustrated embodiment, the protective coating 42 is urethane, specifically a two part polyurethane enamel. An example of a suitable urethane is Polane T PU Enamel.

II. Manufacturing Process

The polymer fuel tank is generally formed from sheets in thermoforming of material (not shown) that include polyethylene or a similar material laminated to a primary vapor barrier layer 30 such as EVOH. These sheets are formed to specific sizes and shapes into an upper shell half 16 and lower shell half 18. Configuration, shape, and size of these shell halves 16 and 18 will vary from application to application. The shell halves 16 and 18 are then joined, such as by welding, while the material is still molten. In the illustrated embodiment, pressure and heat are applied to the flanges 20 on the upper and lower shell halves 16 and 18, causing them to be pinched together to form the shell structure of the fuel tank 10. The above described assembly of a fuel tank 10 containing a primary barrier layer is well known in the art. In the blow molding process the fuel tank is manufactured by extruding a hollow parison and closing the molds on it. As the molds close, the opposite sides of the parison represent the two sheet halves 16 and 18 in the thermoforming process. The mold welds the opposing sides of the parison creating the same wall structure of the thermoformed tank.

The present invention comprises the addition of a secondary barrier layer 40 that may be applied at approximately room temperature and having a permeation rate less than that of the structural layer. The fuel tank may be pre-treated to increase the adhesion of the secondary barrier layer 40 to the fuel tank. The secondary barrier layer 40 is applied to the exterior surface of the fuel tank 10 and then dried to a film. As is discussed above, the secondary barrier layer 40 may be applied to the interior surface of the fuel tank 10 without departing from the scope of the invention.

In the illustrated embodiment, the polyvinylidene chloride is purchased in a powder or pellet form and mixed with a solvent such as ethyl acetate, methyl ethyl ketone or similar acetate ketone solvents. The polyvinylidene chloride solution is prepared by measuring a percent by weight of the final solution polyvinylidene chloride. The percent of polyvinylidene chloride ranges from a lower limit of 1%, preferably 10%, more preferably 12.5% and yet more preferably about 15%, to an upper limit of 35%, preferably 29%, more preferably 26.5%, and yet more preferably to 25%. Of course, the polyvinylidene chloride solution may be bought as a premade mixture needing no preparation. If materials other than polyvinylidene chloride are used as the secondary vapor barrier layer 40, the above specified solvents and percents by weight, may need to be varied.

In the illustrated embodiment, before the secondary barrier layer 40 is applied to the fuel tank 10, the fuel tank is pre-treated to increase the adhesion between the fuel tank 10 and the secondary barrier layer. Surface treatment transforms the surface of the fuel tank 10 into an adhereable substrate. Typically, ordinary polymer materials such as polyolefin materials and polyethylene cannot be easily adhered to, sealed, or printed on, without pretreatment. Methods of pretreatment are well known in the art and include mechanical abrasion, flame treatment, arc plasma treatment, plasma treatment, corona discharge treatment, or other methods of pretreatment known to promote adhesion by creating the necessary bonding surface. Except for the mechanical abrasion technique, all of the above listed pretreatment processes cause a chemical change in the surface structure, which increases the surface energy, thereby allowing easier adhesion of materials to the surface. Treatment can be applied locally to the area to be coated or to the whole tank. It should be readily recognized that tanks could have the secondary barrier layer 40 applied without pretreatment.

The secondary barrier layer 40 may be applied to the fuel tank 10 in a variety of ways, including: (1) dipping the fuel tank 10 in a vat of polyvinylidene chloride; (2) spraying the secondary barrier layer 40 on the fuel tank 10; and (3) painting or rolling the secondary barrier layer 40 on the fuel tank 10. Of course it should be readily recognized that other methods of applying the secondary barrier layer 40 may be easily substituted without taking away from the present invention. In the illustrated embodiment, the secondary barrier layer 40 of polyvinylidene chloride is applied at a temperature from a lower limit of 15° C., preferably 18° C., and more preferably 21° C. to an upper limit of 40° C., preferably 33° C., more preferably 30° C. and yet more preferably 27° C. Of course, these application temperatures may vary for materials other than polyvinylidene chloride.

In the dip tank method, the fuel tank 10 is dipped into a liquid secondary barrier layer solution. In dipping the fuel tank 10, the fuel tank 10 may be completely immersed to coat the entire surface, or the fuel tank 10 can be partially immersed to localize the coating to the area requiring the secondary barrier layer. For localized coverage, the tank may be dipped multiple times to cover the areas needing coverage due to the shape of the fuel tank 10. Of course, it should be readily recognized that the tank could be partially immersed and then rotated to obtain the same results.

In the rolling or painting method, an item saturated with the liquid secondary barrier layer 40 is applied to or brushed across the surface of the fuel tank 10, coating the desired areas. The coating may be applied to localized areas needing the secondary barrier layer 40 or to the entire tank 10. A paint roller, paintbrush, or a variety of other means may be used to paint or roll on the secondary barrier layer.

In the illustrated embodiment, the secondary barrier layer 40 is sprayed onto the surface of the fuel tank 10. A variety of spray techniques similar to the spray techniques used for applying paint or lacquer to a surface may be used to apply the secondary barrier layer 40 to the fuel tank 10. In the preferred application process, the secondary barrier layer 40 is sprayed on to the fuel tank using a high volume low pressure (HVLP) spray gun system such as the Binks Mach 1 HVLP air spray gun using a fluid pressure within a range from a lower limit of 0.5 psi, preferably 2 psi, more preferably 3.5 psi and yet more preferably 5 psi to an upper limit of 40 psi, preferably 30 psi, more preferably 28 psi and yet more preferably 25 psi, and an air pressure with a range from a lower limit of 5 psi, preferably 10 psi, more preferably 17 psi and yet more preferably 20 psi to an upper limit of 60 psi, preferably 50 psi, more preferably 44 psi and yet more preferably 40 psi. Of course the fluid pressure and air pressure will vary depending on the type of spray system, type of spray gun, material being used as the secondary barrier layer 40, and the weight percent of the secondary barrier layer 40 within the solvent. The secondary barrier layer 40 may also be applied by automated spraying mechanisms.

After the fuel tank 10 has been sprayed, dipped, or rolled/painted, the fuel tank 10 is passed through an oven to cure the secondary barrier layer so that the solvent is baked off, leaving a film. The oven is set to temperatures within the normal operating range of the fuel tank 10 to prevent any degradation of the fuel tank. The oven is generally operated at a temperature range with a lower limit of 82° C. to an upper limit of 121° C., preferably 105° C., more preferably 97° C., and yet more preferably 94° C. The fuel tanks 10 should stay in the oven until the solvent is baked off. The time of baking may vary depending on the temperature of the oven. A continuous oven may also be used, allowing the fuel tanks to be conveyed through the oven. It should be readily recognized that the time in the oven will vary as the temperature varies, and that the oven time and temperature may vary depending on the type of oven used. It should also be recognized that some secondary barrier layers 40 may cure at room temperature.

The protective coating 42 may be applied over the secondary barrier layer 40. The protective coating 42 may be applied by techniques similar to the secondary barrier layer 40, and in the illustrated embodiment, is sprayed over the secondary barrier layer 40. The protective coating 42 may be applied before or after the secondary barrier layer 40 is dried. If applied after the secondary barrier layer has dried, the protective coat may also be oven dried, with the oven temperatures and processes being approximately the same as for the secondary barrier layer 40. The oven times and temperatures are approximately the same as used for curing the secondary barrier layer 40. Of course, the times and temperatures of the oven may also vary depending on the material used for the protective coating 42. It should also be recognized that the protective coating 42 may cure at room temperature without the use of an oven.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention.

What is claimed is:

1. A polymeric fuel tank comprising:
   a first shell half joined to a second shell half at a pinch-off area, each shell half having a multilayer wall having an ethylene vinyl alcohol copolymer primary barrier layer and a structural layer; and
   a polymeric secondary barrier layer attached to at least said pinch-off area, said structural layer between said primary barrier layer and said secondary barrier layer, wherein said primary barrier layer and said secondary barrier layer have a hydrocarbon permeability rate less than said structural layer, said secondary barrier layer being solvent soluble and wherein said secondary barrier layer consists of polyvinylidene chloride.

2. The polymeric fuel tank of claim 1 wherein said primary barrier has a permeation rate to hydrocarbon vapors of less than 10 mg/mm–m$^{2}$.

3. The polymeric fuel tank of claim 1 wherein said polymeric secondary battier layer is applied to the portions of multilayer wall proximate to the pinch-off area.

4. The polymeric fuel tank of claim 1 further including a protective coating being attached to the exterior surface of said secondary barrier layer.

5. The polymeric fuel tank of claim 4 wherein said protective coating provides a chemical and environmental barrier for protecting the secondary barrier.

6. The polymeric fuel tank of claim 5 wherein said protective coating is urethane.

7. The polymeric fuel tank of claim 6 wherein said urethane is a two part polyurethane enamel.

8. The polymeric fuel tank of claim 1 wherein said structural layer includes an outer surface and wherein said polymeric secondary barrier layer is applied to the complete outer surface.

9. The polymeric fuel tank of claim 8 wherein said secondary barrier layer is polyvinylidene chloride.

10. A polymeric fuel tank formed by the process of:
    forming a first structural shell half and a second structural shell halt, said structural shells being formed from a multilayer polymeric material having an ethylene vinyl alcohol copolymer primary barrier layer and a structural layer;
    joining said first end second structural shells to form a pinch-off area; and
    applying a secondary polymeric barrier layer consisting of polyvinylidene chloride to said structural layer of said multilayer shell structure and in particular to said pinch-off area, said structural layer being between said primary barrier layer and said secondary polymeric barrier layer, said secondary polymeric barrier layer having a hydrocarbon permeability rate less than said structural layer.

11. The polymeric fuel tank of claim 10 wherein said secondary polymeric barrier layer is applied by spraying.

12. The polymeric fuel tank of claim 10 further including applying a protective coating to said secondary polymeric barrier layer.

13. The polymeric fuel tank of claim 12 wherein said protective coating is solvent soluble, water resistant, and more durable from abrasion than said secondary polymeric layer.

14. The polymeric fuel tank of claim 13 wherein said protective coating is urethane.

* * * * *

UNITED STATES PATENT AND TRADEMARK OFFICE
CERTIFICATE OF CORRECTION

PATENT NO. : 7,211,307 B2
APPLICATION NO. : 10/278419
DATED : May 1, 2007
INVENTOR(S) : James F. Potter et al.

It is certified that error appears in the above-identified patent and that said Letters Patent is hereby corrected as shown below:

On the Title Page, Item (73) Assignee, "Techologies" should be --Technologies--.

On the Title Page, Item (56) References Cited, Foreign Patent Documents, "362-163824" should be --62-163824--.

On the Title Page, Item (56) References Cited, Foreign Patent Documents, "406-106690" should be --6-106690--.

On the Title Page, Item (56) References Cited, Foreign Patent Documents, "0638634" should be --06328634--.

Column 8, line 29, Claim 3, "battier" should be --barrier--.

Column 8, line 49, Claim 10, "halt" should be --half--.

Column 8, line 53, Claim 10, "end" should be --and--.

Signed and Sealed this

Third Day of July, 2007

JON W. DUDAS
*Director of the United States Patent and Trademark Office*